US009953396B1

(12) United States Patent
Peng et al.

(10) Patent No.: US 9,953,396 B1
(45) Date of Patent: Apr. 24, 2018

(54) RAY CASTING VISUALIZATION MULTI-USER INTERACTION PROCESSING METHOD BASED ON HADOOP AND CUDA

(71) Applicant: Shandong University of Science and Technology, Qingdao (CN)

(72) Inventors: Yanjun Peng, Qingdao (CN); Jiawei Yu, Qingdao (CN); Yuanhong Wang, Qingdao (CN); Ruisheng Jia, Qingdao (CN); Xinming Lu, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 15/715,367

(22) Filed: Sep. 26, 2017

(30) Foreign Application Priority Data

Sep. 28, 2016 (CN) .......................... 2016 1 0860044

(51) Int. Cl.
| | |
|---|---|
| *G06T 1/20* | (2006.01) |
| *G06T 15/08* | (2011.01) |
| *G06T 15/06* | (2011.01) |
| *G06F 17/30* | (2006.01) |

(52) U.S. Cl.
CPC ................ *G06T 1/20* (2013.01); *G06T 15/06* (2013.01); *G06T 15/08* (2013.01); *G06F 17/30194* (2013.01)

(58) Field of Classification Search
CPC ...................................................... G06T 15/06
See application file for complete search history.

(56) References Cited

U.S. PATENT DOCUMENTS

2006/0274065 A1* 12/2006 Buyanovskiy .......... G06T 15/06
345/424
2009/0189889 A1 7/2009 Engel et al.

FOREIGN PATENT DOCUMENTS

| CN | 104299254 A | 1/2015 |
|---|---|---|
| CN | 105809731 A | 7/2016 |

OTHER PUBLICATIONS

F. Wang, A. Aji, H. Vo High performance spatial queries for spatial big data: from medical imaging to GIS SIGSPATIAL Spec., 6 (3) (2014), pp. 11-18.*

* cited by examiner

*Primary Examiner* — Kee M Tung
*Assistant Examiner* — Grace Q Li
(74) *Attorney, Agent, or Firm* — Buchanan Ingersoll & Rooney PC

(57) ABSTRACT

The present invention relates to the technical field of visualization in scientific computing, and specifically discloses a ray casting visualization multi-user interaction processing method based on Hadoop and CUDA. On one hand, the method of the present invention employs the parallel processing capability of Hadoop, MapReduce, and NVIDIA CUDA for accelerated rendering, and, on the other hand, the present invention designs a method to avoid duplicate computation for a multi-user interaction environment, thereby reducing the time consumption of duplicate computation. The method of the present invention realizes the fast operation of each pixel gradient, ray resampling and data synthesis and can accomplish the 3D visualization imaging rapidly and efficiently.

5 Claims, 8 Drawing Sheets

RAY CASTING VISUALIZATION MULTI-USER INTERACTION PROCESSING METHOD BASED ON HADOOP AND CUDA

TECHNICAL FIELD

The present invention relates to the technical field of visualization in scientific computing, and specifically relates to a ray casting visualization multi-user interaction processing method based on Hadoop and CUDA.

BACKGROUND

With the rapid development of modern medical device applications such as MRI, PET and CT, the 3D medical visualization has been widely applied in the medical diagnosis, adjuvant therapy, surgical planning and other fields. The 3D medical visualization volume rendering technique has a very good application value and prospect because of its good "fidelity". However, with significant improvement in the accuracy and resolution of the medical digital image, the amount of medical image data increases rapidly, its ultra-large-scale medical image data and ultra-large computational complexity became the bottlenecks of achieving the 3D medical volume rendering. At present, in order to meet the ultra-large computational complexity and multi-user interaction requirement of large-scale medical image data volume rendering, the studies in recent years have focused on parallel volume rendering, GPU-based hardware acceleration and efficient parallel computing of GPU embedded MapReduce. S. Eilemann, et al. designed the parallel volume rendering to meet the requirements of fast volume rendering. The data storage and processing based on CUDA (compute unified device architecture) designed by Dong Xianling from School of Biomedical Engineering, Southern Medical University, Qin Xujia from College of Computer Science & Technology, Zhejiang University of Technology, et al. achieve the parallel ray-casting algorithm. The computing framework based on MapReduce designed by Vo H T, et al. achieves the z-buffer rendering based on MapReduce, parallel mesh simplification and isosurface extraction and other basic graphics algorithms. Data storage and processing based on CUDA is one example of a parallel computing platform and programming model, but it is to be understood the following discussions referencing CUDA could apply to other types of parallel computing platforms and programming models as well.

Although the above-mentioned methods have reached a certain level of accelerated rendering effect, there are certain shortcomings and disadvantages, for example, single CUDA processing must be supported by the NVIDIA graphics card hardware, thereby increasing costs, and the stand-alone rendering restricts speeding up; furthermore, the computation of a large amount of duplicate data also increases the system processing load, thus wasting the system resources.

SUMMARY OF THE INVENTION

The objective of the present invention is to propose a ray casting visualization multi-user interaction processing method based on Hadoop and CUDA which can realize the 3D visualization imaging rapidly and efficiently.

In order to achieve the said objective, the present invention adopts the following technical solution:

A ray casting visualization multi-user interaction processing method based on Hadoop and CUDA, it comprises:

Step 1: Prior to local processing, different users shall obtain the data to render an image;
  Wherein, the data of an image include the following parameters: duplicate query identifier CX, number of slices C, start number D, end number E, line of sight direction F, viewpoint position G, generated image width W, generated image height H, duplicate type CTYPE, duplicate number of slices CC, duplicate start number CD, duplicate end number CE and data DATA;
Step 2: The master machine of the cluster server obtains the data of an image, then compares the data of an image with the data stored in the master machine for avoiding duplicate computation and queries any data result to be computed in the cluster server;
  Wherein, the data stored for avoiding duplicate computation includes the following parameters: start number X, end number Y, line of sight direction L, viewpoint position M, number of uses N, time T, no replacement identifier NOREP and data DATA0;
  Step 2.1: Judge whether there are duplicate data results in the cluster;
    If the judgment result is that there are duplicate data, the duplicate type CTYPE is set to Partial Duplicate, the value of which is 1, the no replacement identifier NOREP value is plus 1 and Step 2.2 is performed;
    Or if the judgment result is that there are no duplicate data, Step 3 is performed;
  Step 2.2: Judge whether the data result is full duplicate;
    If the judgment result is full duplicate, the duplicate type CTYPE is set to Full Duplicate, the value of which is 2, and Step 11 is performed;
    Or if the judgment result is partial duplicate, Step 3 is performed;
Step 3: Read the corresponding non-duplicate image slices and establish a 3D data field;
Step 4: Crop the invalid voxels of the 3D data field using the AABB bounding box;
Step 5: Process the gradients with NVIDIA CUDA;
Step 6: Transfer the processed data to the master machine of the cluster server;
  Wherein, the processed data includes the following parameters: duplicate query identifier cx, number of slices c, start number d, end number e, line of sight direction f, viewpoint position g, generated image width w, generated image height h, duplicate type ctype, duplicate number of slices cc, duplicate start number cd, duplicate end number ce and data data;
Step 7: Compare the received data in Step 6 with the data stored in the master machine for avoiding duplicate computation and query the computation result of the received data in the cluster server;
  Wherein, the data stored for avoiding duplicate computation includes the following parameters: start number x, end number y, line of sight direction l, viewpoint position m, number of uses n, time t, no replacement identifier norep and data data0;
  Step 7.1: Judge whether there are duplicate data in the cluster;
    If the judgment result is that there are duplicate data, the corresponding stored duplicate data data0 is read, the no replacement identifier norep is minus 1 and Step 7.2 is performed;

Or if the judgment result is that there are no duplicate data, Step 8 is performed;

Step 7.2: Judge whether the data result is full duplicate;

If the judgment result is that the data result is full duplicate, in which case, the full duplicate data are stored in the data data and the no replacement identifier norep is minus 1, then Step 11 is performed;

Or if the judgment result is that the data result is partial duplicate, Step 8 is performed;

Step 8: The cluster mapreduce performs the parallel computing processing;

Step 8.1: The non-duplicate data data to be processed is uploaded to HDFS;

Step 8.2: The master machine slices the data into multiple sub-data which is then sent to each slave machine for processing;

Step 8.3: Each slave machine processes the ray synthesis and resampling tasks separately, with the generated results being stored;

Step 8.4: Download the generated result from HDFS and read it to the memory of the master machine;

Step 9: Judge whether there is data integration;

If the judgment result is that there is data integration, the duplicate data data0 is integrated with the generated result into the final result;

Or if the judgment result is that there is no data integration, Step 10 is performed;

Step 10: Replace the duplicate data data0 with the least recently used (LRU) principle;

Step 11: Send back the data data to the user;

Step 12: Output and display the generated 2D image;

Step 13: Judge whether the line of sight direction f is changed;

If the judgment result is that the line of sight direction is changed, Step 2 is performed;

Or if the judgment result is that the line of sight direction is not changed, end.

In Step 2.1, the specific process of judging whether there are duplicate data results in the cluster is as follows:

If the following conditions are satisfied simultaneously, that is, start number D≤start number X<end number Y≤end number E, line of sight direction F=line of sight direction L, viewpoint position G=viewpoint position M, then it is judged that there are duplicate data; otherwise, it is judged that there are no duplicate data;

In Step 2.2, the specific process of judging whether the data result in the cluster is full duplicate is as follows:

If the following conditions are satisfied simultaneously, that is, start number D=start number X, end number Y=end number E, line of sight direction F=line of sight direction L, viewpoint position G=viewpoint position M, then it is judged that the data result is full duplicate; otherwise, it is judged that the data result is partial duplicate.

Step 5 comprises the following steps:

Step 5.1: Request the GPU (graphics processing unit) graphics memory spaces cuinArray & cuoutArray; wherein, the graphics memory space cuinArray stores the incoming data while the graphics memory space cuoutArray stores the generated outgoing data;

Step 5.2: Copy the cropped 3D data field to the GPU graphics memory space cuinArray;

Step 5.3: Bind the data in the graphics memory space cuinArray to the 3D Texture using a texture memory;

Step 5.4: Perform the multi-threaded data processing in the Kernel function, calculate each pixel gradient value greyxyz and then store the results to the GPU graphics memory space cuoutArray;

Step 5.5: Copy the data in the GPU graphics memory space cuoutArray to the host memory and remove the texture binding, releasing the occupied graphics memory spaces cuinArray & cuoutArray.

In Step 7.1, the specific process of judging whether there are duplicate data results in the cluster is as follows:

If the following conditions are satisfied simultaneously, that is, start number d≤start number x<end number y≤end number e, line of sight direction f=line of sight direction l, viewpoint position g=viewpoint position m, it is judged that there are duplicate data; otherwise, it is judged that there are no duplicate data;

In step 7.2, the specific process of judging whether the data in the cluster is full duplicate is as follows:

If the following conditions are satisfied simultaneously, that is, start number d=start number x, end number y=end number e, line of sight direction f=line of sight direction l, viewpoint position g=viewpoint position m, it is judged that the data are full duplicate; otherwise, it is judged that the data are partial duplicate;

In Step 9, the specific process of judging whether there is data integration is as follows:

If the following conditions are satisfied simultaneously, that is, start number d<start number x<end number y<end number e, line of sight direction f=line of sight direction l, viewpoint position g=viewpoint position m, it is judged that there is data integration; otherwise, it is judged that there is no data integration.

Compared with the prior arts, the method of the present invention has the following advantages: On one hand, the method of the present invention employs the parallel processing capability of Hadoop MapReduce and NVIDIA CUDA for accelerated rendering. On the other hand, the present invention designs a method to avoid duplicate computation for a multi-user interaction environment, thus reducing the time consumption of duplicate computation. The method of the present invention realizes the fast operation of each pixel gradient, ray resampling and data synthesis.

BRIEF DESCRIPTION OF THE DRAWING FIGURES

FIGS. 1A, 1B, 1C, 1D, and 1E illustrate portions of a flow chart of a ray casting visualization multi-user interaction processing method based on Hadoop and CUDA in the present invention.

DETAILED DESCRIPTION OF THE INVENTION

Now, the present invention will be described in further detail with reference to the drawings and specific embodiments:

As shown in FIGS. 1A, 1B, 1C, 1D, and 1E, a ray casting visualization multi-user interaction processing method based on Hadoop and CUDA comprises the following steps:

Step 1: Prior to local processing, different users shall obtain the data cxdata to render an image.

Wherein, the data cxdata of an image include the following parameters: duplicate query identifier CX, number of slices C, start number D, end number E, line of sight direction F, viewpoint position G, generated image width W, generated image height H, duplicate type CTYPE, duplicate number of slices CC, duplicate start number CD, duplicate end number CE and data DATA.

Step 2: The master machine of the cluster server obtains the data cxdata of an image, then compares the data cxdata with the data stored in the master machine for avoiding duplicate computation and queries any data result to be computed in the cluster server.

Wherein, the data ComposedResult stored for avoiding duplicate computation includes the following parameters: start number X, end number Y, line of sight direction L, viewpoint position M, number of uses N, time T, no replacement identifier NOREP and data DATA0.

Step 2.1: Judge whether there are duplicate data results in the cluster; the specific process of judgment is as follows:

If the following conditions are satisfied simultaneously, that is, start number D≤start number X<end number Y≤end number E, line of sight direction F=line of sight direction L, viewpoint position G=viewpoint position M, then it is judged that there are duplicate data; otherwise, it is judged that there are no duplicate data.

After judgment, if the judgment result is that there are duplicate data, the duplicate type CTYPE is set to partial duplicate, the value of which is 1, the no replacement identifier NOREP value is plus 1 and Step 2.2 is performed.

Or if the judgment result is that there are no duplicate data, Step 3 is performed.

Step 2.2: Judge whether the data result is full duplicate; the specific process of judgment is as follows:

If the following conditions are satisfied simultaneously, that is, start number D=start number X, end number Y=end number E, line of sight direction F=line of sight direction L, viewpoint position G=viewpoint position M, then it is judged that the data are full duplicate; otherwise it is judged that the data are partial duplicate;

After judgment, if the judgment result is full duplicate, the duplicate type CTYPE is set to full duplicate, the value of which is 2, and Step 11 is performed.

Or if the judgment result is partial duplicate, Step 3 is performed.

Figures 2, 3:
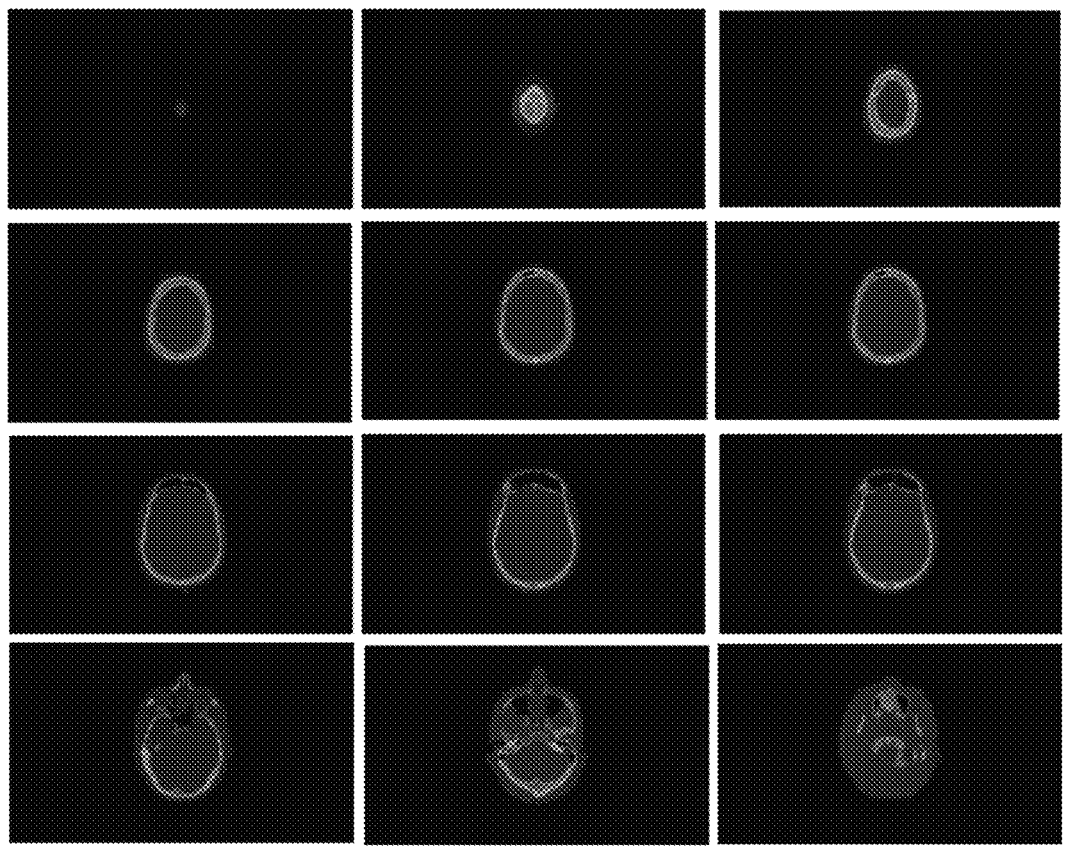
FIG. 2 illustrates some slices of the data set in the present invention.
FIG. 3 illustrates a partial original data screenshot of the 3D data field in the present invention.

Step 3: Read the head CT slice image in the Visible Human data set, some slice images of which are as shown in FIG. 2, and establish a 3D data field pDataField.

Figures 4, 5, 6:
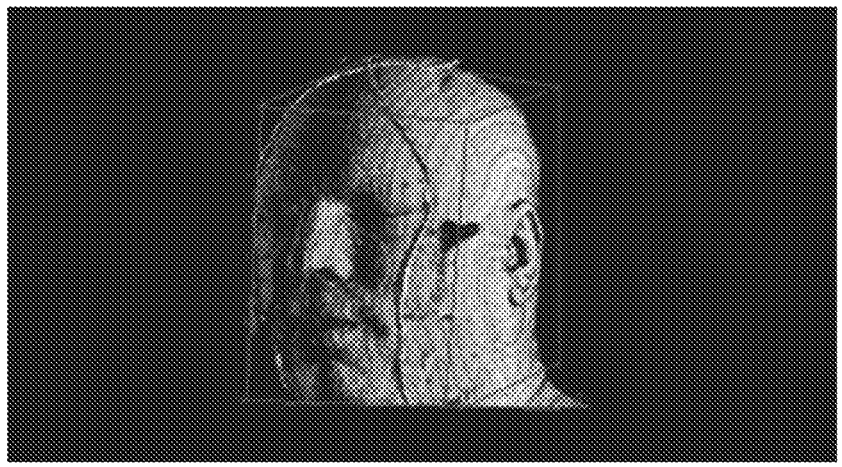
FIG. 4 illustrates a schematic diagram for cropping the 3D data field with an AABB bounding box in the present invention.
FIG. 5 illustrates a partial screenshot after the gradient calculation with the NVIDIA CUDA in the present invention.
FIG. 6 illustrates a partial data screenshot after ray sampling and synthesis in the present invention.

Step 4: Crop the invalid voxels of the 3D data field using the AABB bounding box. After cropping, each slice is reduced from 587*341 to 303*287. The partial original data are as shown in FIG. 3. The schematic diagram for cropping is as shown in FIG. 4.

Step 5: Process the gradients with NVIDIA CUDA. The partial screenshot of their result data is as shown in FIG. 5.

Step 5 specifically comprises:

Step 5.1: Request the GPU graphics memory spaces cuinArray & cuoutArray; wherein, the graphics memory space cuinArray stores the incoming data while the graphics memory space cuoutArray stores the generated outgoing data.

Step 5.2: Copy the cropped 3D data field pDataField to the GPU graphics memory space cuinArray by using cudaMemcpy3D.

Step 5.3: Bind the data in the graphics memory space cuinArray to the 3D Texture using the cudaBindTextureToArray ( ) function in texture memory. The texture coordinates are non-normalized, and the texture addressing mode is cudaAddressModeClamp.

Step 5.4: Perform the multi-threaded data processing in the Kernel function, calculate each pixel gradient value greyxyz and then store the results to the GPU graphics memory space cuoutArray.

Perform the multi-threaded data processing in the Kernel function and pick the texture with tex3D(texRef, x, y, z) where x, y and z are texture picking coordinates, and calculate the each pixel gradient value with the center difference method. For voxel (i,j,k), the calculation equation is:

$$\begin{cases} Gx(v) = (f(i+\Delta s, j, k) - f(i-\Delta s, j, k))/(2\Delta s); \\ Gy(v) = (f(i, j+\Delta s, k) - f(i, j-\Delta s, k))/(2\Delta s); \\ Gz(v) = (f(i, j, k+\Delta s) - f(i, j, k-\Delta s))/(2\Delta s); \end{cases}$$

Where f(i,j,k) is the grey value at the voxel(i, j, k), and $\Delta s$ is a specific constant.

Step 5.5: Copy the data in the GPU graphics memory space cuoutArray to the host memory and remove the texture binding, releasing the occupied graphics memory spaces cuinArray & cuoutArray.

Step 6: Transfer the processed data to the master machine of the cluster server.

Wherein, the processed data includes the following parameters: duplicate query identifier cx, number of slices c, start number d, end number e, line of sight direction f, viewpoint position g, generated image width w, generated image height h, duplicate type ctype, duplicate number of slices cc, duplicate start number cd, duplicate end number ce and data data.

Step 7: Compare the received data in Step 6 with the data stored in the master machine for avoiding duplicate computation and query the computation result of the received data in the cluster server;

Wherein, the data ComposedResult stored for avoiding duplicate computation includes the following parameters: start number x, end number y, line of sight direction l, viewpoint position m, number of uses n, time t, no replacement identifier norep and data data0.

Step 7.1: Judge whether there are duplicate data in the cluster. The specific process of judgment is as follows:

If the following conditions are satisfied simultaneously, that is, start number d≤start number x<end number y≤end number e, line of sight direction f=line of sight direction l, viewpoint position g=viewpoint position m, then it is judged that there are duplicate data; otherwise, it is judged that there are no duplicate data.

After judgment, if the judgment result is that there are duplicate data, the corresponding stored duplicate data data0 is read, the no replacement identifier norep is minus 1 and Step 7.2 is performed;

Or if the judgment result is that there are no duplicate data, Step 8 is performed;

Step 7.2: Judge whether the data result is full duplicate; the specific process of judgment is as follows:

If the following conditions are satisfied simultaneously, that is, start number d=start number x, end number y=end number e, line of sight direction f=line of sight direction l, viewpoint position g=viewpoint position m, then it is judged that the data are full duplicate; otherwise, it is judged that the data are partial duplicate.

After judgment, if the judgment result is that the data result is full duplicate, in which case, the full duplicate data are stored in the data data and the no replacement identifier norep is minus 1, then Step 11 is performed;

Or if the judgment result is that the data result is partial duplicate, Step 8 is performed.

Step 8: The cluster mapreduce performs the parallel computing processing; partial data after sampling and synthesis is as shown in FIG. 6.

Step 8 specifically comprises the following steps:

Step 8.1: The non-duplicate data data to be processed is uploaded to RDFS.

Step 8.2: The master machine slices the data into multiple sub-data which are transferred to each slave machine for processing;

Each sub-data contain information such as the starting sampling point, sampling interval and corresponding pixel coordinates in th-e image. Each sub-node corresponds to a sub-task, the sub-tasks are assigned to different slave machine nodes so as to perform the ray synthesis and resampling computation, and finally the image synthesis. The job scheduling mechanism is set to fair scheduling so that the submitted jobs can obtain the computing resources so that different users can share the cluster fairly and avoid waiting for a long time.

Step 8.3: Each slave machine like Slave1, Slave2 or Slave3 in FIG. 1D processes the ray synthesis and resampling tasks separately, saving the generated result dataout1;

The ray synthesis is performed from back to front and the computation equation is $C_{out(i)}=C_{in(i)}*(1-A_{now(i)})+C_{now(i)}*A_{now(i)}$;

Where, $C_{now(i)}$ is the grey value of Voxel i, $A_{now(i)}$ is opacity, $C_{in(i)}$ is the grey value of the sampling point i, $C_{out(i)}$ is the grey value after passing through the sampling point i.

Resampling is performed with the trilinear interpolation method and the computation equation is $v_p=v_0(1-x)(1-y)(1-z)+v_1(1-x)y(1-z)+v_2(1-x)(1-y)z+v_3(1-x)yz+v_4x(1-y)(1-z)+v_5xy(1-z)+v_6x(1-y)z+v_7xyz$;

Where, $v_p$ is the value of the sampling point P(x,y,z) to be computed, and $v_0$ to $v_7$ are the known values of the 8 vertices of the cube cell of the voxel where the sampling point is located.

Step 8.4: Download the generated result dataout1 from HDFS and read it to the memory of the master machine.

Step 9: Judge whether there is data integration; the specific process of judgment is as follows:

If the following conditions are satisfied simultaneously, that is, start number d<start number x<end number y<end number e, line of sight direction f=line of sight direction l, viewpoint position g=viewpoint position m, then it is judged that the data are partial duplicate, in which case, there is data integration; otherwise, it is judged that there is no data integration.

After judgment, if the judgment result is that there is data integration, the duplicate data data0 is integrated with the generated result dataout1 into the final result data.

Or if the judgment result is that there is no data integration, Step 10 is performed.

Step 10: Replace the duplicate data data0 with the least recently used (LRU) principle;

After the cluster has processed the data once, it replaces a previously stored data data0. First read the no replacement identifier. If the value is greater than zero, the data are not replaced. Then, the principle of minimum number of uses n is employed. If the number of uses n is the same, the data are replaced in the principle of the longest time t used by the latest storage or reading.

Step 11: Send back the data data to the user;

Step 12: Output and display the generated 2D images;

Step 13: Judge whether the line of sight direction f is changed;

If the judgment result is that the line of sight direction is changed, Step 2 is performed;

Or if the judgment result is that the line of sight direction is not changed, end.

Figure 1A:
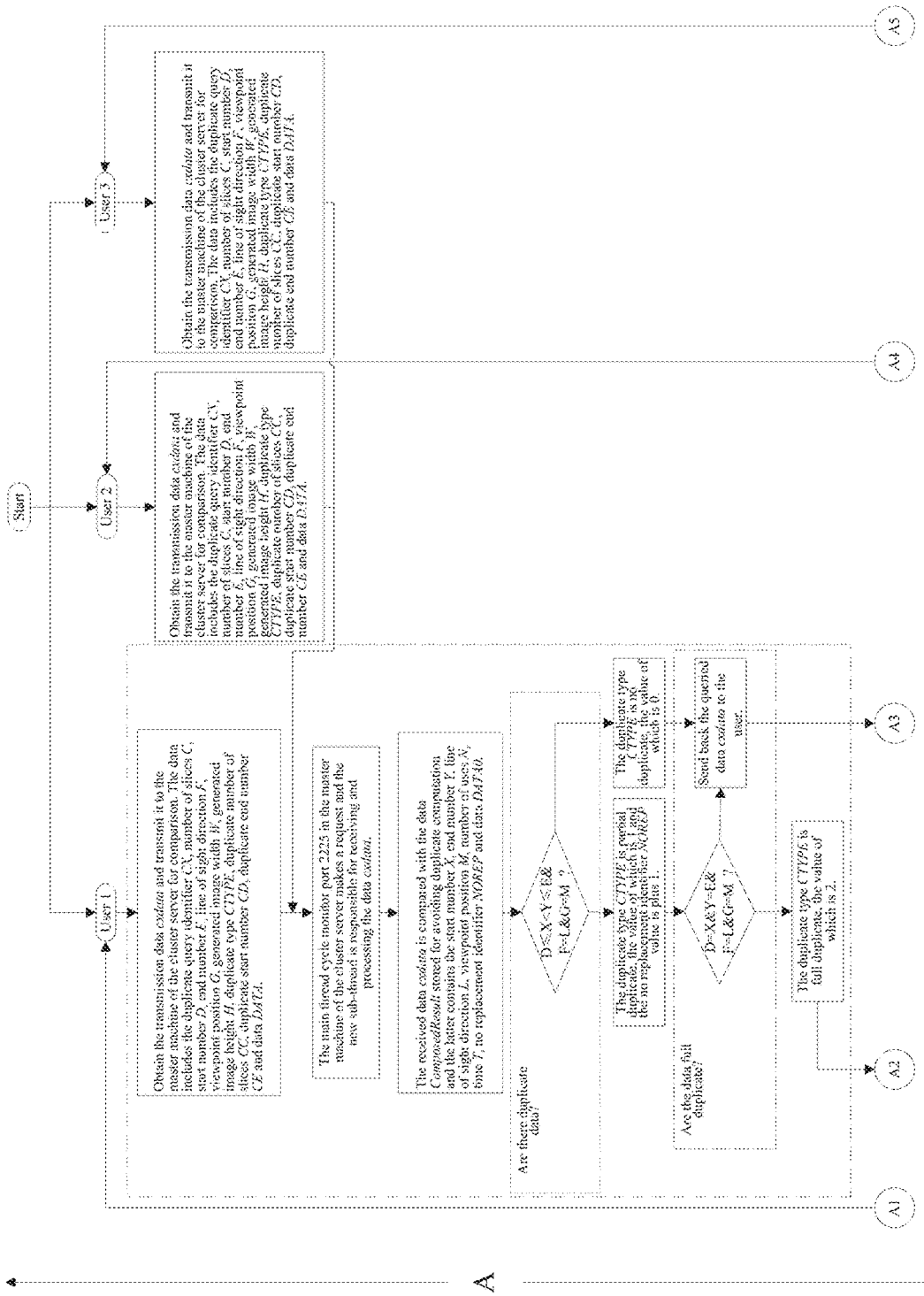
Figure 1B:
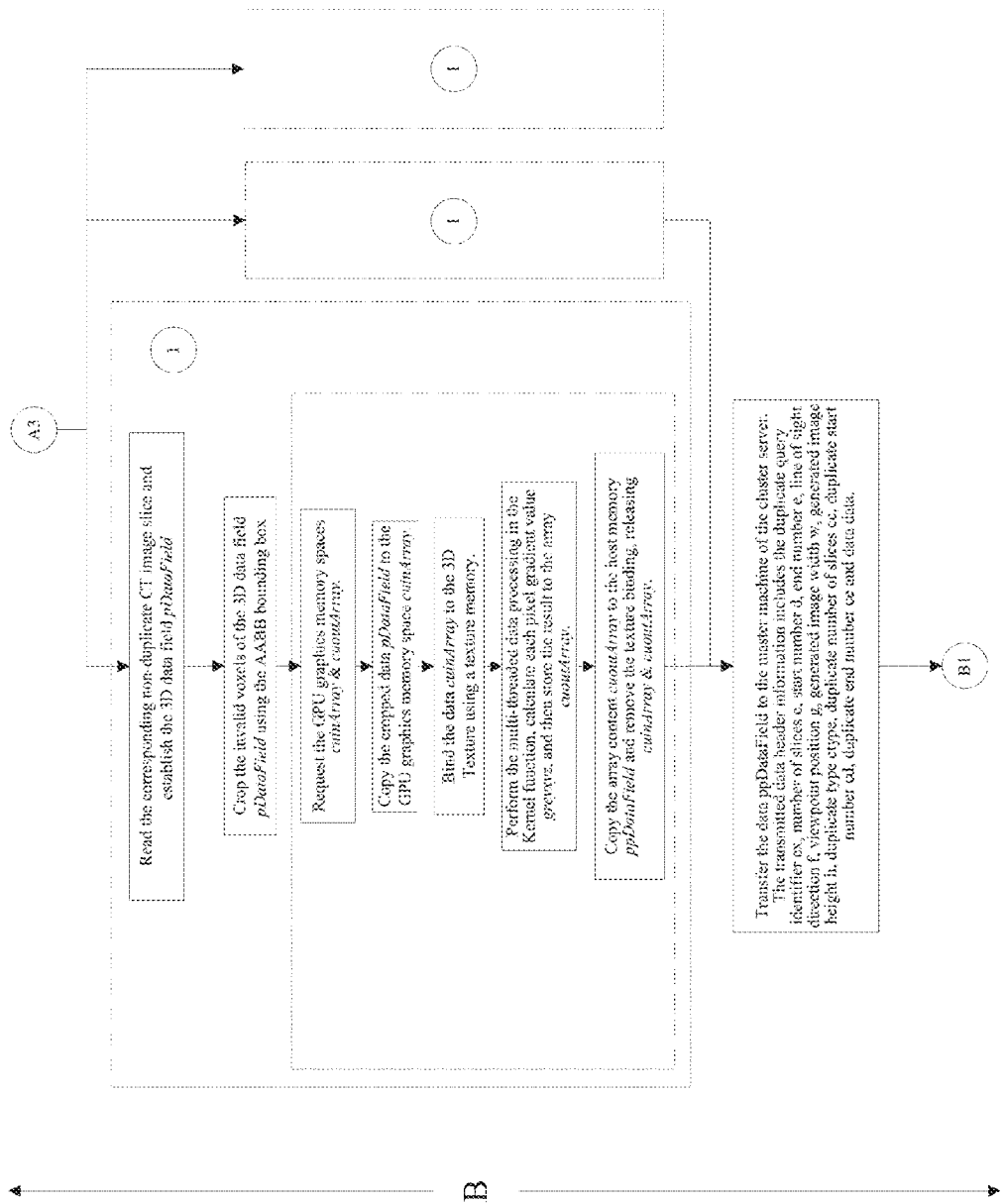
Figure 1C:
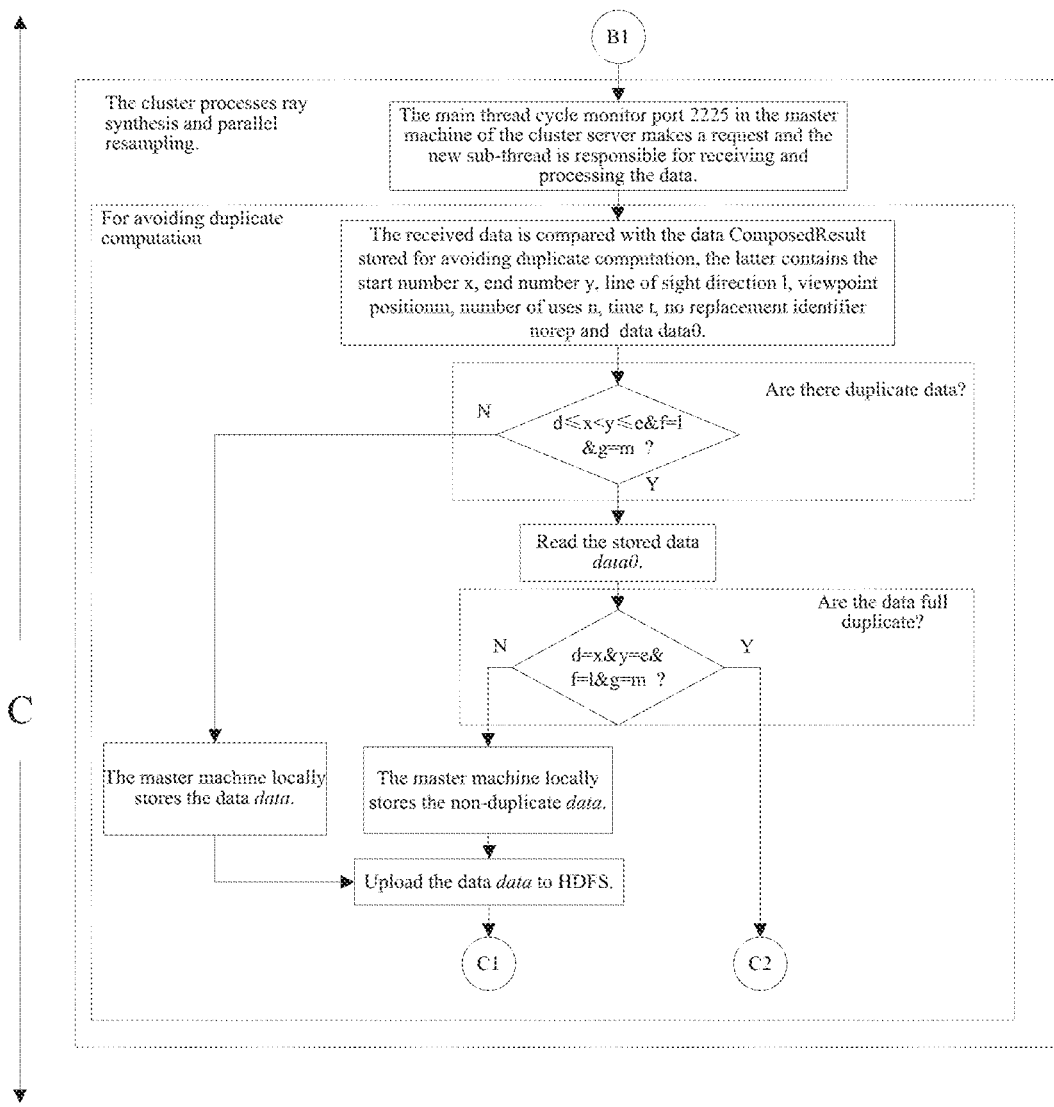
Figure 1D:
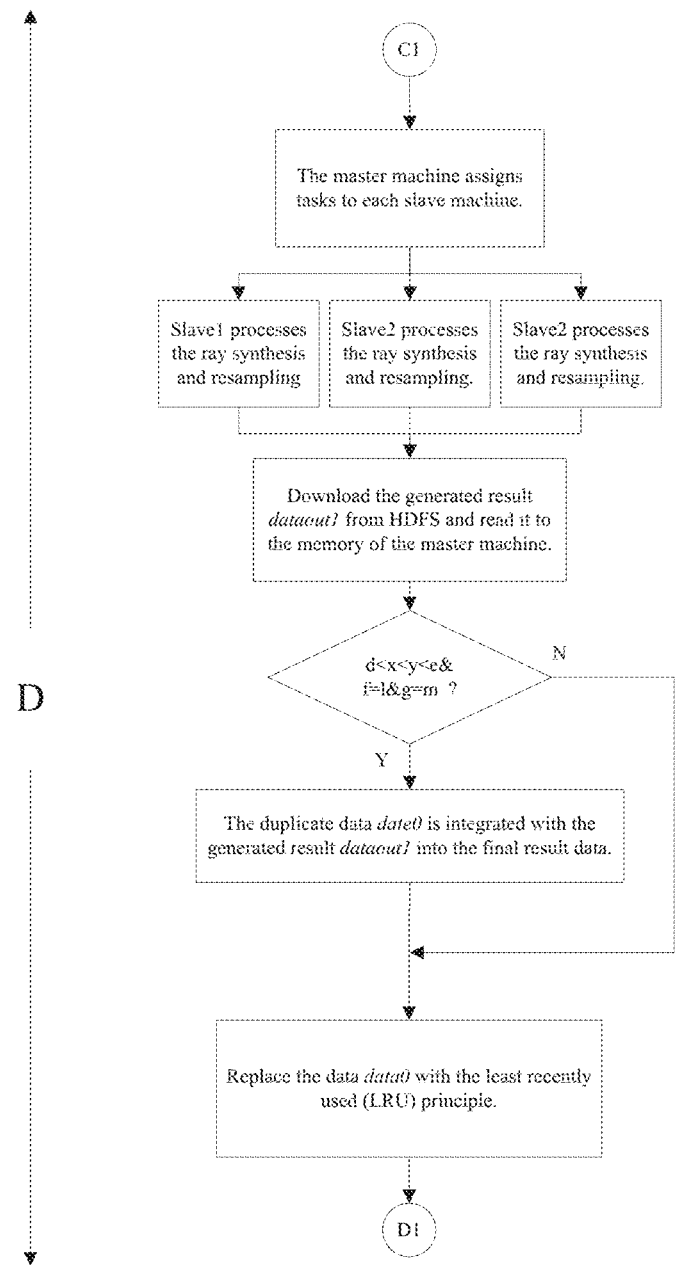
Figure 1E:
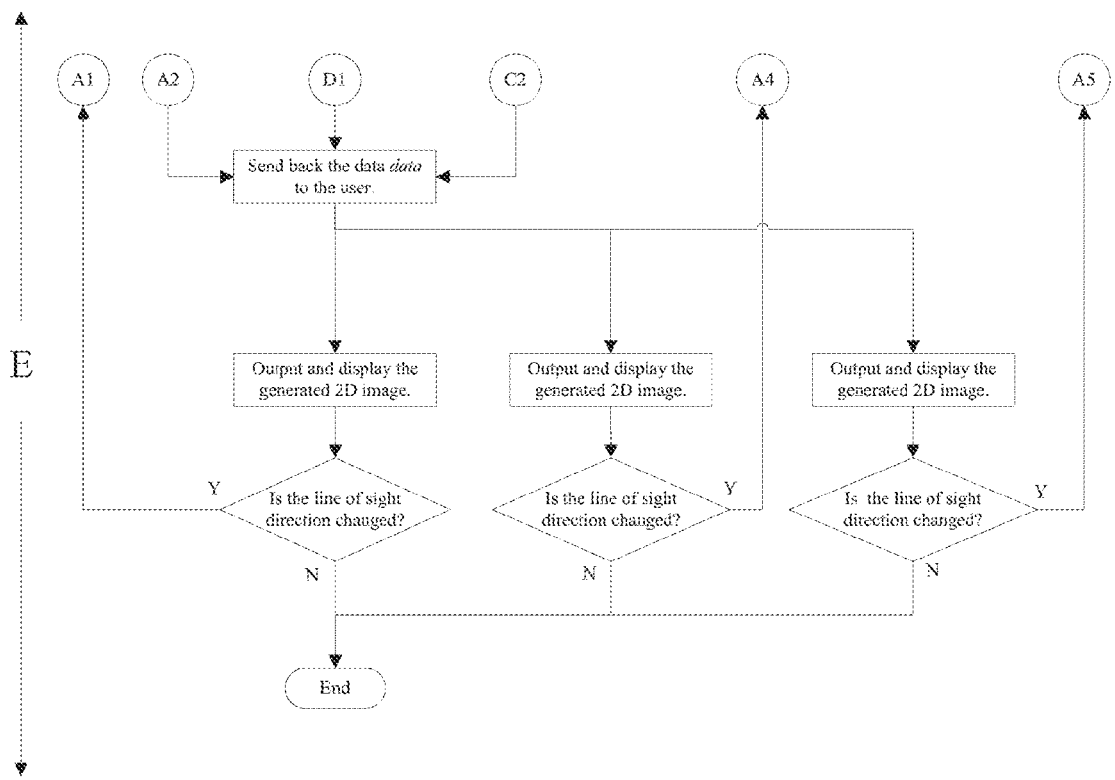

It is to be noted that, since the processing process in the block marked with ⊕ in FIG. 1B corresponding to User 2 and User 3 is the same as that in the block marked with ⊕ corresponding to User 1, it is not shown.

In addition, in order to facilitate the identification of the flow chart given in FIGS. 1A, 1B, 1C, 1D, and 1E are parts of a figure that is divided into five areas, A, B, C, D, and E, from top to bottom.

In view of the actual situation, the computer configuration used for the experiment for the method of the present invention is as follows:

The computer is configured with a Core i3-370 dual-core four-thread processor, a 3 GB memory, a NVIDIA GeForce GT420M graphics card, a 1 GB graphics memory and a Windows 7 64-bit operating system;

The cluster is configured with a Core i7-4790 quad-core eight-thread processor, 8 GB memory and Windows 7 64-bit operating system where four nodes are established with the Vmware Workstation 11 virtual machine, the master machine is configured with a dual-core processor, 1.5 GB memory, 20 GB hard drive, the 3 slave machines are configured with the single-core processor, 1 GB memory, 20 GB hard drive, the nodes of the four machines are configured with the ubuntu 14.04 operating system and equipped with hadoop 2.60.

Figure 7:
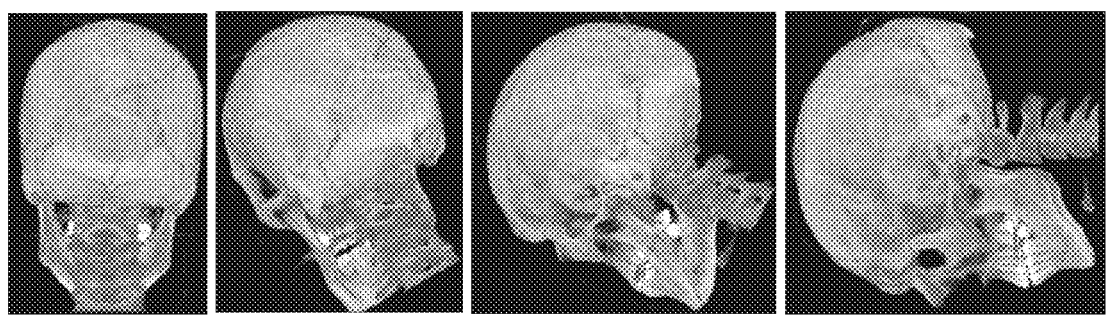
FIG. 7 illustrates a skull bone image generated with the method of the present invention.
Figure 8:
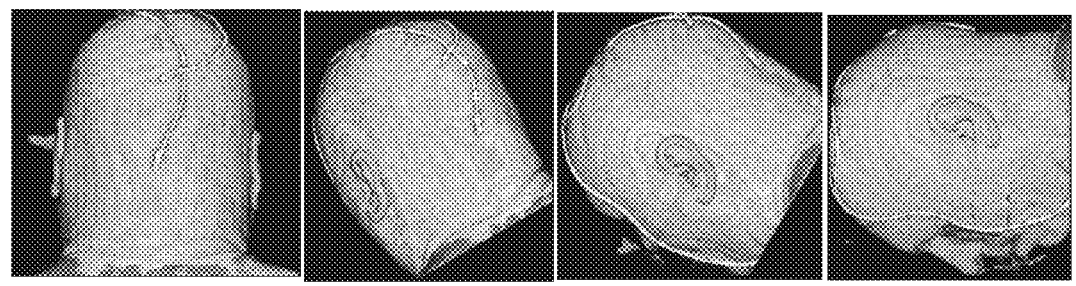
FIG. 8 illustrates a skull skin image generated with the method of the present invention.

In addition, the present invention also provides a table for comparison between the operation time taken by the stand-alone processing and that taken by the processing with the method of the present invention, which is as shown in Table 1. FIGS. 7 and 8 show the image results of the skull bone and skin generated by the method of the present invention.

TABLE 1

Processing Time for the Method of the Present Invention

| | | | Processing for Avoiding Duplicate Computation | | | |
|---|---|---|---|---|---|---|
| | | | Processing of up to 150 pieces | | Processing of up to 200 pieces | |
| Number of Slices (Pieces) | Stand-processing Time (s) | Default Processing Time | mapreduce Processing Time (s) | Total Time (s) | mapreduce Processing Time (s) | Total Time (s) |
| 150 | 62.016 | 43.569 | 0 | 14.805 | | |
| 200 | 88.639 | 54.851 | 10 | 40.102 | 0 | 17.519 |
| 230 | 97.511 | 61.307 | 13 | 46.246 | 9 | 35.023 |

Compared with the above-mentioned experimental results, it can be seen that the ray casting visualization multi-user interaction processing method of the present invention, on one hand, employs the parallel processing capability of Hadoop MapReduce and NVIDIA CUDA for accelerated rendering, thus realizing rapid operation of each pixel gradient, ray resampling and data synthesis, and, on the other hand, designs a method to avoid duplicate computation for a multi-user interaction environment, reducing the time consumption of duplicate computation and the waste of system resources, thus enhancing the rendering efficiency.

Of course, the foregoing description is merely the preferred embodiments of the present invention, and the present invention is not limited to the above-described embodiments, and it should be noted that any and all equivalent alternatives or obvious variants made by any person skilled in the field under the guidance of this specification shall fall into the true scope of this Specification and shall be protected by the present invention.

What is claimed is:

1. A ray casting visualization multi-user interaction processing method based on Hadoop and CUDA comprising:

each user obtaining data to render an image prior to local processing, wherein the data to render the image includes a duplicate query identifier CX, number of slices C, start number D, end number E, line of sight direction F, viewpoint position G, generated image width W, generated image height H, duplicate type CTYPE, duplicate number of slices CC, duplicate start number CD, duplicate end number CE, and other data DATA;

executing a process of avoid duplicates with a master machine by obtaining the data of the image, wherein the master machine compares the data of the image with data stored in the mater machine to avoid duplicate computations;

wherein the master machine queries data results to be computed in the cluster;

wherein the data stored for avoiding duplicate computations includes a start number X, end number Y, line of sight direction L, viewpoint position M, number of uses N, time, no replacement identifier NOREP, and other data DATA0;

determining whether there are duplicate data results in the cluster and when it is determined there are duplicate data results, a duplicate type CTYPE for the data is set to partial duplicate and the no replacement identifier NOREP is set to a first value, and when the duplicate data results are full duplicates, the duplicate type CTYPE for the data is set to full duplicate;

wherein when the duplicate type CTYPE for the data is set to partial duplicate:

reading the corresponding non-duplicate image slides and establishing a 3D data field;

cropping the invalid voxels of the 3D data field using the AABB bounding box;

processing the gradients in parallel;

transferring the processed data to the master machine of the cluster, the processed data including a duplicate query identifier cx, number of slices c, start number d, end number e, line of sight direction f, viewpoint position g, generated image width w, generated image height h, duplicate type ctype, duplicate number of slices cc, duplicate start number cd, duplicate end number ce, and other data data;

comparing the transferred data with the data stored in the master machine to avoid duplicate computations and querying the computation result of the received data in the cluster;

determining whether duplicate data exists, in the cluster, wherein when duplicate data exists the corresponding stored duplicated data is read, the no replacement identifier NOREP is set to a second value;

when it is determined duplicate data exists in the cluster, determining whether the duplicate data is a full duplicate;

wherein when the duplicate data is a full duplicate, the full duplicate data are stored in the data DATA and the no replacement identifier NOREP is set to the second value;

wherein when the duplicate data is a partial duplicate:

non-duplicate data to be processed is uploaded, the master machine slices the data into multiple sub-data which are each sent to a slave machine for processing, each slave machine processing the ray synthesis and resampling tasks separately and storing the generated results, and downloading the generated result and reading the generated result to the master machine;

determining if data integration exists, wherein when data integration exists, duplicate data is integrated with the generated result into a final result; wherein when data integration does not exist, replacing the duplicate data DATA0 using least recently used data and generating the final result;

transmitting the final result and displaying a 2D generated image from the final result;

determining whether the line of sight has changed, wherein when the line of sight has changed, repeating the execution of the process of avoiding duplicates with the master machine.

2. The ray casting visualization multi-user interaction processing method based on Hadoop and CUDA according to claim 1, wherein the determining of whether there are duplicate results in the cluster comprises:
- determining a first condition where the start number D is less than or equal to the start number X which is less than end number Y which is less than or equal to the end number E;
- determining a second condition where the line of sight direction F is equal to the line of sight direction L;
- determining a third condition where the viewpoint position G is equal to the line of sight viewpoint position M;
- wherein when the first, second, and third conditions are satisfied simultaneously, it is judged the data result is duplicate data, and otherwise it is judged the data result is not duplicate data;
- determining a fourth condition where the start number D is equal to the start number X;
- determining a fifth condition where the end number Y is equal to the end number E;
- determining a sixth condition where the line of sight direction F is equal to the line of sight direction L;
- determining a seventh condition where the viewpoint position G is equal to the viewpoint position M;
- wherein when the fourth, fifth, sixth, and seventh conditions are satisfied simultaneously, it is judged the data result is a full duplicate, and otherwise it is judged the data result is partially duplicate data.

3. The ray casting visualization multi-user interaction processing method based on Hadoop and CUDA according to claim 1, wherein processing the gradients in parallel comprises:
- requesting graphics memory spaces cuinArray and cuoutArray, wherein the cuinArray graphics memory space stores the incoming data and the cuoutArray memory space stores the generated outgoing data;
- copying a cropped 3D data field to the graphics memory space cuinArray;
- binding the data in graphics memory space cuinArray to a 3D texture using texture memory;
- performing multi-threaded data processing in a kernel function;
- calculating each pixel gradient value greyxyz and storing the results in the graphics memory space cuoutArray;
- copying the data in the graphics meory space cuoutArray to host memory and removing the texture binding;
- releasing memory spaces cuinArray and cuoutArray.

4. The ray casting visualization multi-user interaction processing method based on Hadoop and CUDA according to claim 1, wherein the determining whether duplicate data exists in the cluster comprises:
- determining a first condition where the start number d is less than or equal to start number x which is less than end numbery which is less than or equal to the end number e;
- determining a second condition where the line of sight direction f is equal to the line of sight direction l;
- determining a third condition where the viewpoint position g is equal to the viewpoint position m;
- wherein when the first, second, and third conditions are satisfied simultaneously, it is judged the data result is duplicate data, and otherwise it is judged the data result is not duplicate data;
- determining a fourth condition where the start number d is equal to start number x;
- determining a fifth condition where the end numbery is equal to the end number e;
- determining a sixth condition where the line of sight direction f is equal to the line of sight direction l;
- determining a seventh condition where the viewpoint position g is equal to the viewpoint position m;
- wherein when the fourth, fifth, sixth, and seventh conditions are satisfied simultaneously, it is judged the data result is a full duplicate, and otherwise it is judged the data result is partially duplicate data.

5. The ray casting visualization multi-user interaction processing method based on Hadoop and CUDA according to claim 1, wherein the determining if data integration exists comprises:
- determining a first condition where the start number d is less than or equal to start number x which is less than end numbery which is less than or equal to the end number e;
- determining a second condition where the line of sight direction f is equal to the line of sight direction l;
- determining a third condition where the viewpoint position g is equal to the viewpoint position m;
- wherein when the first, second, and third conditions are satisfied simultaneously, it is judged that data integration exists, and otherwise it is judged that data integration does not exist.

* * * * *